United States Patent [19]

Barker

[11] Patent Number: 4,860,726

[45] Date of Patent: Aug. 29, 1989

[54] MULTIPURPOSE WARMING AND HEATING VESSEL

[76] Inventor: Stanley G. Barker, 607 Madison St., Joilet, Ill. 60435

[21] Appl. No.: 195,878

[22] Filed: May 19, 1988

[51] Int. Cl.⁴ .......................... A61F 7/00; A61F 7/08; F24C 1/14; F24C 13/00
[52] U.S. Cl. .......................................... 126/208; 126/4
[58] Field of Search ............................ 126/208, 204, 4

[56] References Cited

U.S. PATENT DOCUMENTS

| | | | |
|---|---|---|---|
| 208,251 | 9/1878 | Mains | 126/208 |
| 2,517,254 | 8/1950 | Steele | 126/4 |
| 2,567,323 | 9/1951 | Cyphert | 126/208 |
| 2,829,635 | 4/1958 | Teller | 126/208 |
| 2,845,924 | 8/1958 | Benda | 126/208 |
| 2,904,031 | 9/1959 | Scott | 126/208 |
| 3,024,782 | 3/1962 | Knopps | 126/208 |
| 3,110,301 | 11/1963 | Bricker | 126/208 |
| 4,457,295 | 7/1984 | Roehr | 126/204 |
| 4,572,188 | 2/1986 | Augustine et al. | 126/204 |
| 4,676,223 | 6/1987 | Peterson | 126/208 |

Primary Examiner—Albert J. Makay
Assistant Examiner—Denise L. Ferensic

[57] ABSTRACT

A multipurpose warming and heating vessel is provided. The vessel has an aperture for receiving a torch or other heat source and a mounting bracket for retaining the torch or heat source assembly in position. Other accessory components include a warmer pod that fits on top of the vessel, a seat, a cushioned ventilated lid suitable as a seating surface, and a duct with air movable means to collect and convey the heat from the heat source to the warming pod or alternately to convey the heat to any item used requiring heat from the warmer, such as a hand warming apron. By rearranging these components the vessel may be configured for storage, for use as a warm seat, for use as a foot warmer, for use as a warm kneeling pad, for use as a small warming oven, for use as a hot plate, or a direct flame type burner. Still other uses are: drying and warming sleeping bags, boots, gloves etc., by positioning the warm discharged air into, around, or through the item to warm it. Tents could be warmed by a system of appropriate capacity.

10 Claims, 7 Drawing Sheets

MULTIPURPOSE WARMING AND HEATING VESSEL

BACKGROUND OF THE INVENTION

In the field of outdoor comfort for sportsmen, workers, coaches etc., heaters and warmers now on the market do not provide the versatility to fulfill different warming requirements.

OBJECT OF THE INVENTION

The object of the invention is to supply a portable heating unit of multipurposes with the versatility in its configurations to be adaptable to supply heat for different warming applications for the body as well as limited food warming and cooking applications, as well as the ability to dispense warming heat to serve any useful purpose, by means of its flexible discharge tube.

Still another object of my invention is to provide a warming vessel which is economical to make, is quite durable and is not necessarily limited to a location with a power supply.

SUMMARY OF THE INVENTION

The present invention consists of a container vessel as a basic structure to store and position components.

A torch with a fuel cylinder is positioned through one side of the vessel at a proper angle to allow the torch tip to insert into a flame tube which is entered through the opposite side of the vessel. The flame tube in turn connects to a flexible duct and fan system to intake the heat of the flame and convey it to warm items, or objects, such as a hand warmer pouch, or an attachable section that is positioned on top of the vessel etc. This attachable section is called a warmer pod and it has a cushioned ventilated lid. When positioned on top of the vessel the warmer pod can be used as a warmed seat or alternately used as a warming oven by placing objects to be warmed inside and covering the vent holes. The oven's size can be increased by mounting another container on top of the warming pod configured to allow the heat to rise up into it. When the warmer pod is removed and placed at ground level it is useful as a warmed kneeling pad, or as a foot warmer.

The torch can be pivoted in its mount to give it yet another use for heating food or liquids that may be placed into the warmer pod when it is positioned on the container vessel without its lid. This is made possible by a screen type bottom in the warming pod that enables the flame to heat items placed in the pod by playing directly up through the screen or onto a metal plate fastened thereon which becomes a hot plate when positioned over the flame for heating objects placed on it.

The container vessel has ventilation openings near the top of the vessel to relieve heat if the heat should back down from the warmer pod due to restricted lid vents when sat on. The heat then vents upwardly around the occupant to continue its warming function.

Openings are provided near the bottom of the vessel to provide drainage from rain accumulation etc.

A check valve is provided in the flame tube to prevent excessive heat from entering the duct without air movement as might happen when the battery is allowed to totally discharge while the flame is on, thereby not providing power or the turbo blower, which tempers the heat with cooler air.

A carry handle is provided to facilitate transportation. The heat source as described is provided by a torch with an attachable fuel cylinder, this is but one embodiment. The heat source could also be supplied by a remote fuel cylinder piped into a torch type unit or by an electric unit powered by a power cable, to supply electric resistance heat as the heat source.

The foregoing and other objects, advantages and functions of the invention will be apparent on reference to the specification and to the attached drawings illustrating preferred embodiments of the invention.

In the drawings FIGS. 1A and 1B are views illustrative of components which may be used in practicing my invention.

While the invention will be described in connection with certain embodiments, it will be understood that I do not intend to limit the invention to those embodiments. On the contrary, I intend to cover all alternatives, modifications, and equivalents as may be included within the spirit and scope of the invention.

Figure 1A:
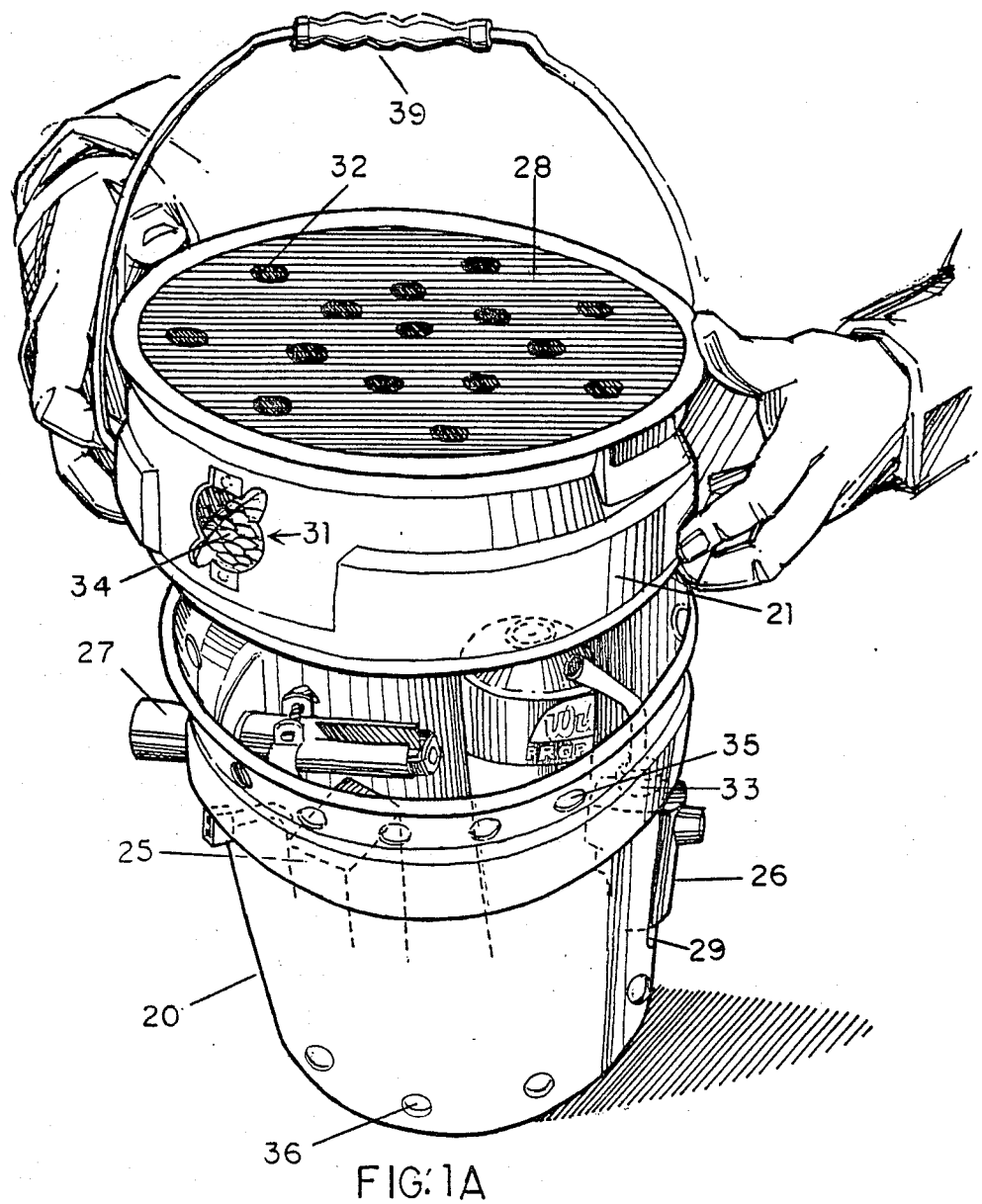
FIG. 1A is a front perspective view of the main vessel without the duct and apron adjunct.
Figure 1B:
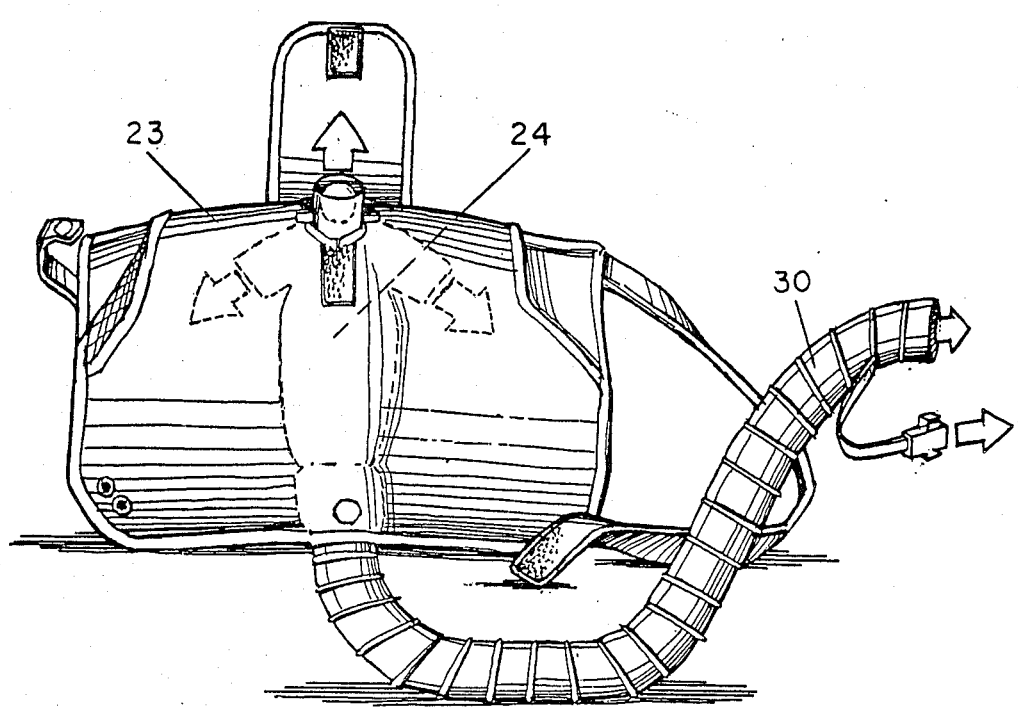
FIG. 1B is a front elevational view illustrating an apron and duct assembly section as used for hand warming.
Figure 2:
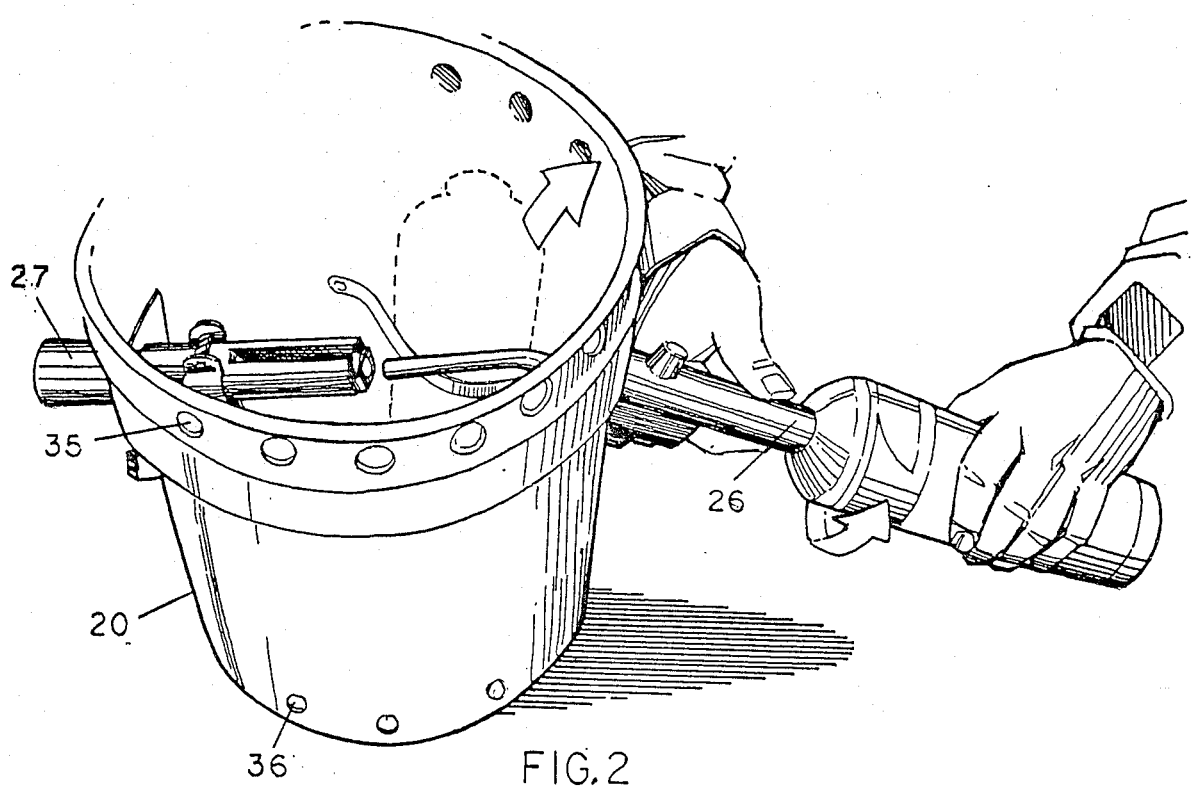
FIG. 2 is a front perspective view of the main vessel illustrative of the gas cylinder being installed on the torch.
Figure 3:
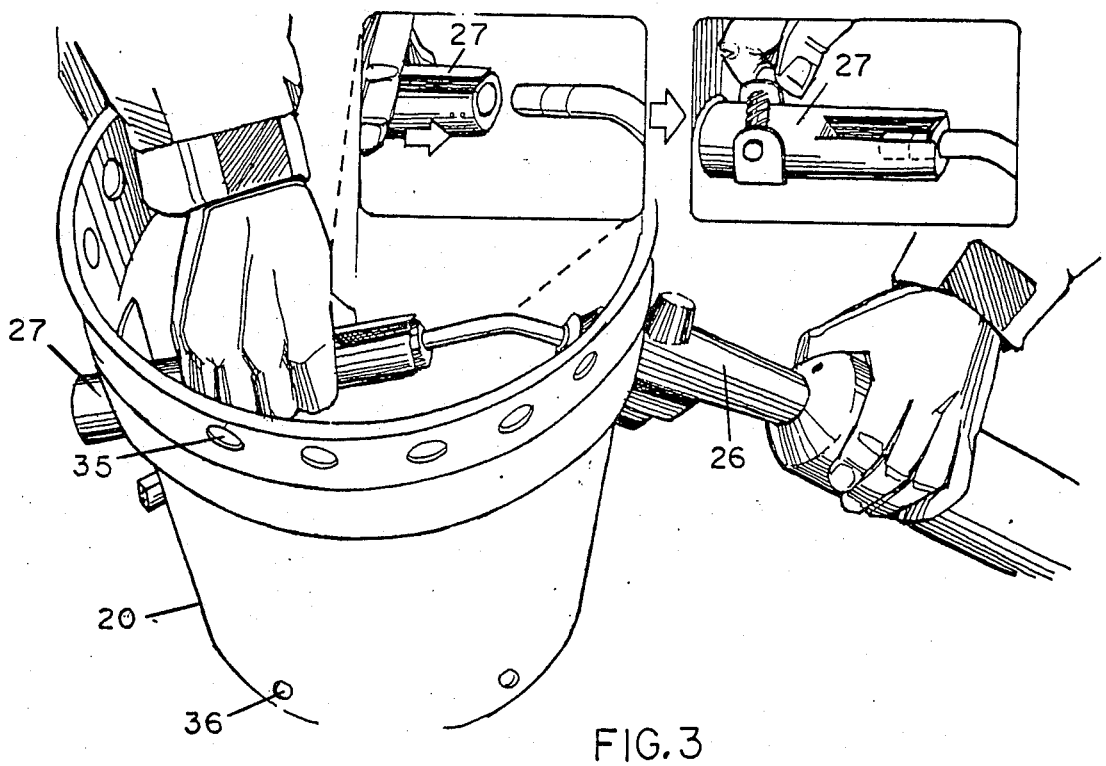
FIG. 3 is a front perspective view with insets illustrative of flame retainer tube relationships as assembled.
Figure 4:
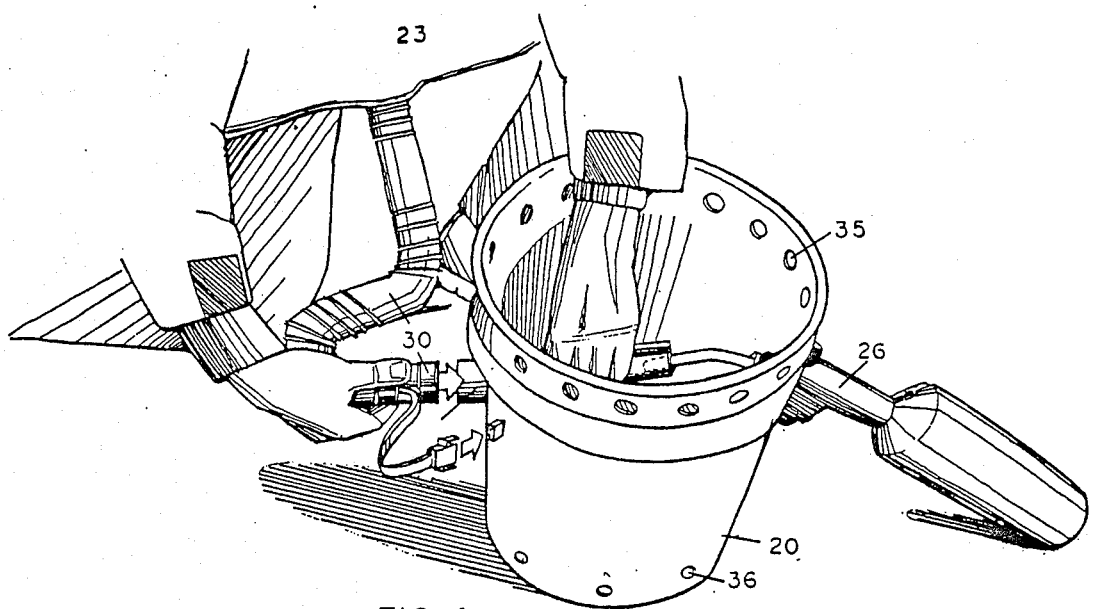
FIG. 4 is a front perspective view illustrative of how duct and battery connections are made.
Figure 5A:
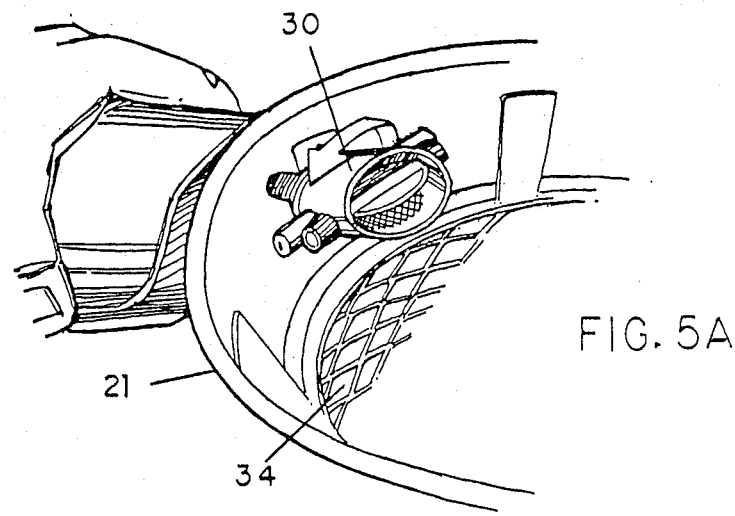
FIG. 5 and FIG. 5A are two perspective views of the warmer pod duct orfice as the duct is inserted and locked in by rotating it.
Figure 5:
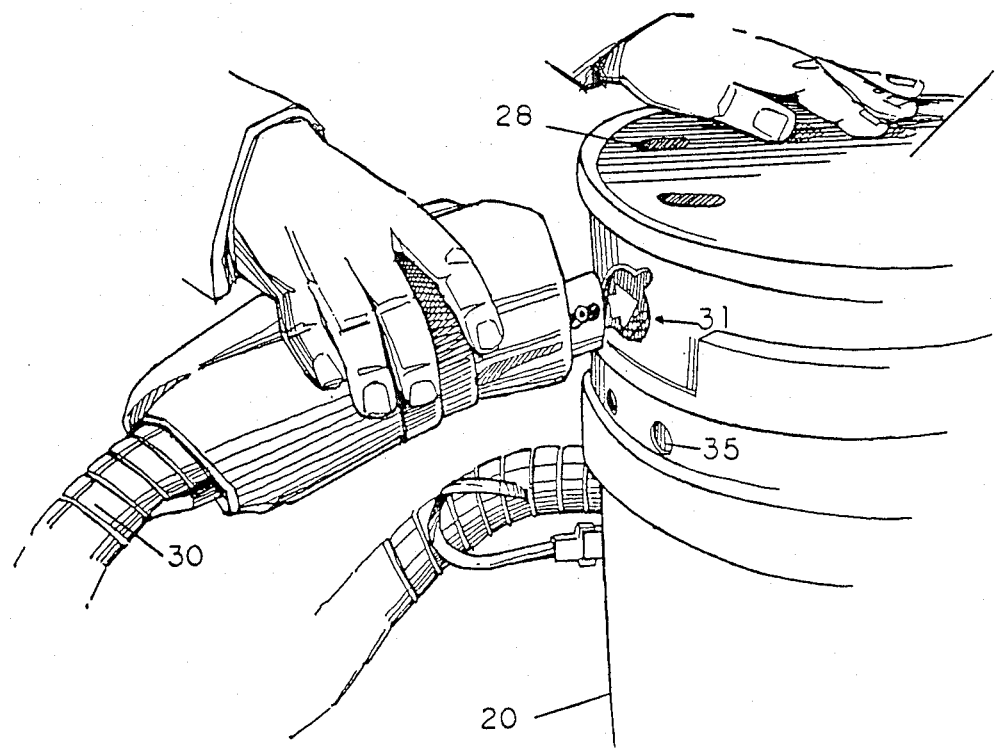
Figure 6:
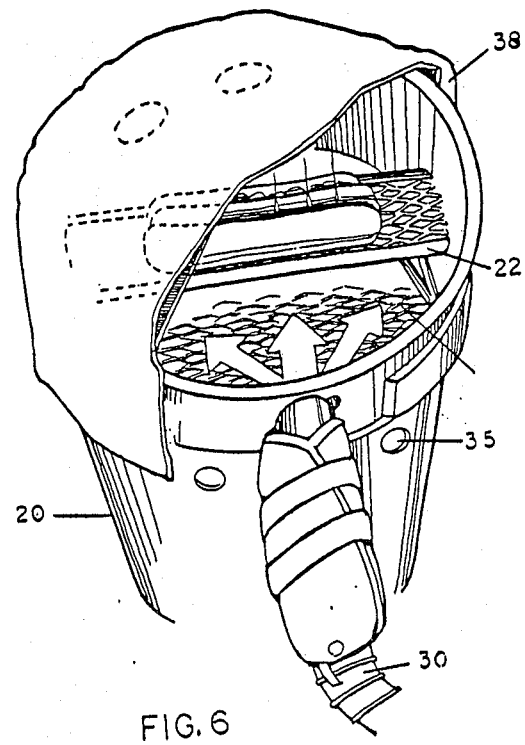
FIG. 6 is a perspective view partly in section illustrative of warming pod use, warming food.
Figure 7:
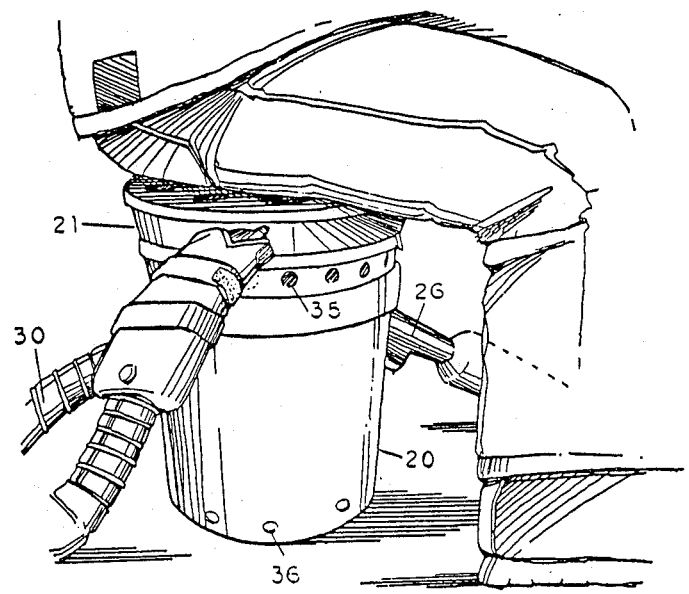
FIG. 7 is a side elevational view of warmer being used as a warmer seat.
Figure 8:
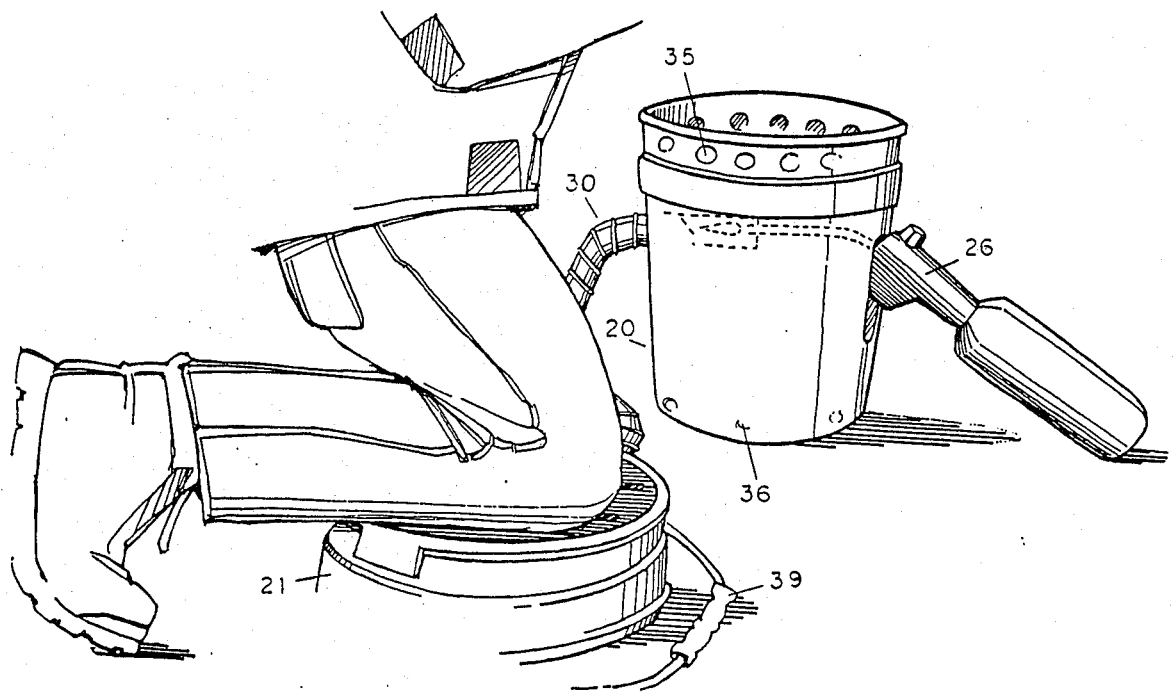
FIG. 8 is a side elevational view of the warmer used as a warm kneeling pad.
Figure 9:
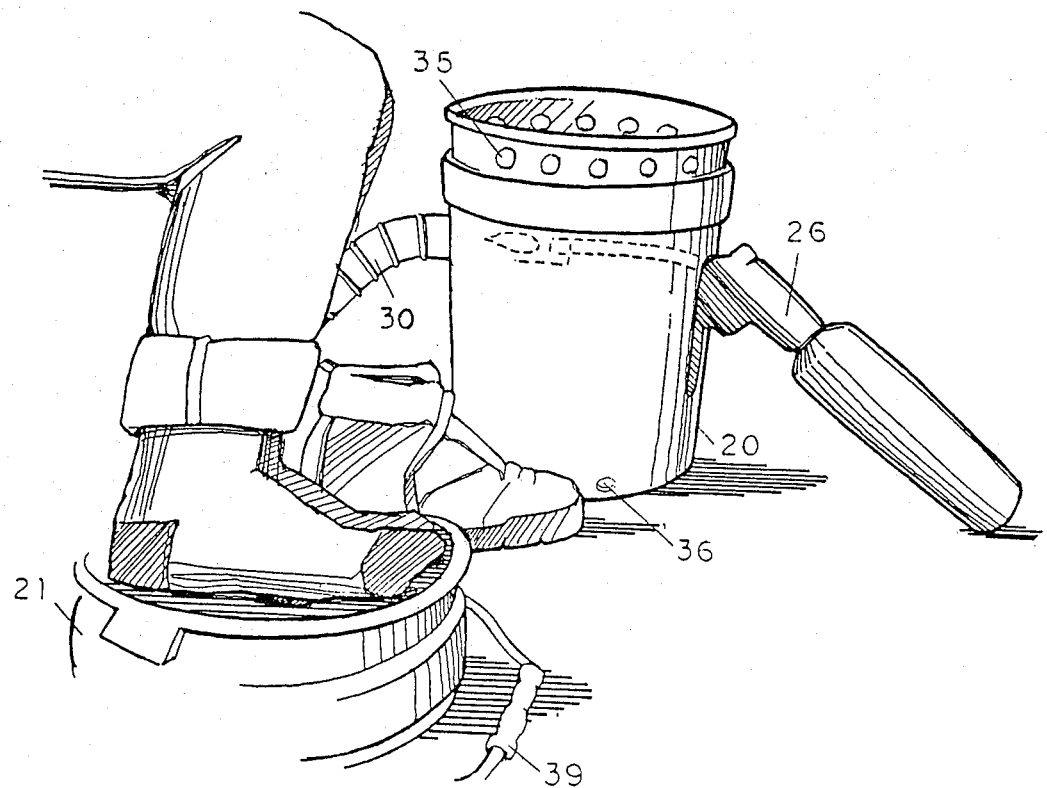
FIG. 9 is a side elevational view of the warmer used as a foot warmer.
Figure 10:
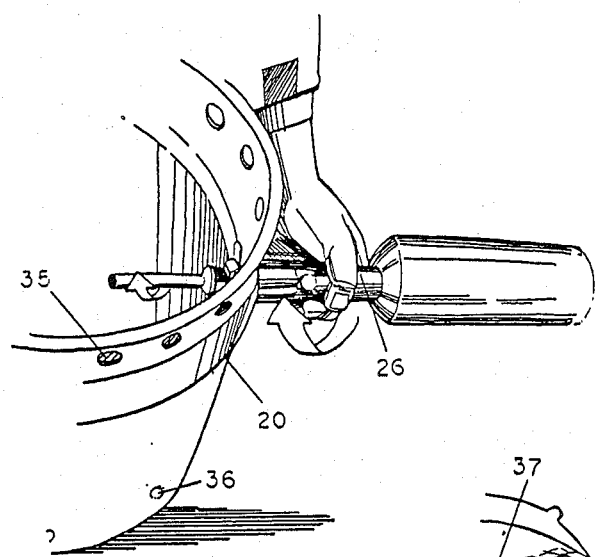
FIG. 10 is a perspective view illustrative of torch rotatability.
Figure 11:
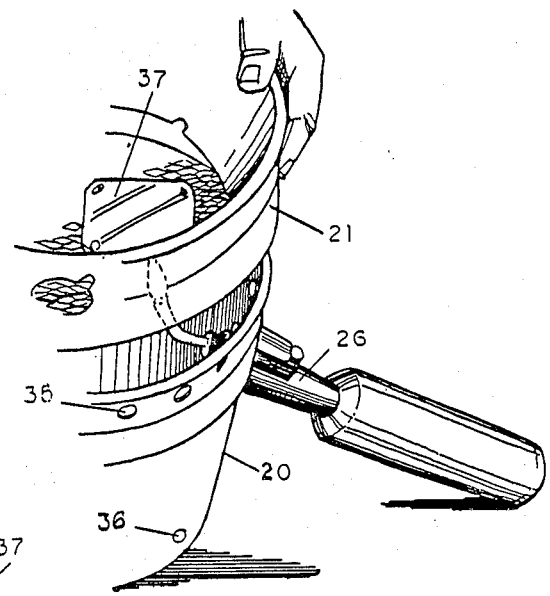
FIG. 11 is a perspective view of warmer with the lid removed and the hot plate located over the torch flame.
Figure 12:
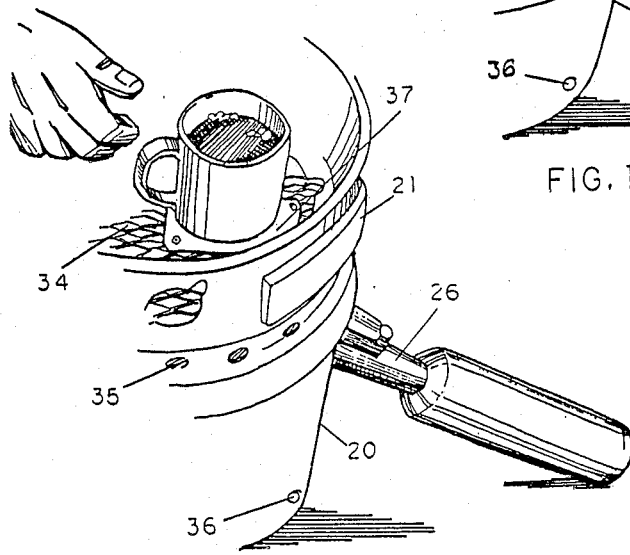
FIG. 12 is a perspective view illustrative of the warmer being used to heat a beverage.

Turning now to the drawings, there is shown in FIG. 1 a multipurpose warming device consisting of a vessel housing 20 including an aperture 29 for receiving a torch 26 assembly and a mounting bracket 33 for retaining the torch 26 in position, a warmer pod 21 that fits on top of the vessel housing 20, a lid 28, a flame tube 27, to contain the torch flame, and a duct with air movable means (turbo blower) 24 to conduct the torch 26 heat from the flame tube 27 to the warmer pod 21, to an apron 23, or other adjuncts or objects that might benefit from the warm air.

The warmer pod 21 is heated by the heated air conveyed to it through duct 30 by the action of the turbo blower 24 moving the heated air from the flame tube 27 through said duct 30 and through aperture 31. The warmer pod lid 28 is configured with holes to allow the heated air to rise through the top surface to warm the seating area.

Power for the turbo blower 24 is supplied from a rechargeable battery 25 stored within the vessel housing 20. A check valve is provided in the air stream to prevent excessive heat from entering the duct 30 system is the torch 26 is operated without the turbo blower 24 operating, which supplies air with the heat to maintain a safe level of heat through the components. When the warmer pod 21 is placed on top of the vessel housing 20 it allows warm air to vent to the seating area which is provided at a comfortable height to accomodate the average person.

The warmer pod 21 can be removed from the vessel housing 20 and positioned on other seats or surfaces such as cold truck or bulldozer seats etc.

The warmer pod 21 can be placed at ground level to provide a warm kneeling surface when it is needed.

The warmer pod 21 may also be used for foot warming when placed at ground level.

Warmer pod 21 also acts as a warming oven for objects that require it such as cold sandwiches, caulking tubes etc. That should be at a warm temperature for use. Oven use is provided by removing the warmer pod lid 28 and placing the objects to be warmed inside, replacing the lid 28 and covering it with a towel 38 or other cover to keep the heat in the warmer pod 21 to warm the inserted objects.

A removable shelf 22 is a desired addition to enable the heated air to circulate completely around objects placed on the shelf. The turbo blower 24 which moves the heated air through the duct 30 from the torch heated flame tube 27 to the warmer pod 21 or apron 23, distributes an even heat due to the mixing action of the air movement, thus minimizing the chance of hot spots throughout the warmer.

The duct dispensing the warm can be directed as required for any useful purpose, such as warming frozen locks, drying wet gloves, melting frost and snow in control boxes etc. The warm air discharges at a controlled temperature regulated by the flame setting of the torch.

The warmth (properely regulated) is not hot enough to burn paint etc. As a torch flame would be by itself, but is hot enough to accomplish the warming results desired as the torch flame heat is tempered by the air aspirated by the turbo blower.

By installing another separate vessel on top of the warming pod a larger space is available to hold instruments or tools to keep them at the proper operating temperature and protect them from the elements. The additional vessel has a vented or open bottom and an access lid for placing and removing articles from the vessel.

By repositioning the torch 26 to play the flame up onto the bottom of the warmer pod 21, the flame is directed through a screened surface 34 on which containers can be placed to heat their contents. The lid 28 of the warmer pod 21 is removed to heat items in this manner.

The screened bottom 34 of the warmer pod 21 also has a metal plate 37 attached to it which is centered over the torch flame, thus creating a hot plate for use as an alternative to direct flame impingement.

Vessel housing 20 has vent openings 35 preventing excessive heat build up. Openings 36 prevent water accumulation.

Carry handle 39 is provided for convenient transportion.

I claim as my invention:

1. A multipurpose warming and heating vessel comprising; a housing, an aperture in said housing for receiving a component to supply a source of heat to the interior of the vessel, a mounting bracket on the housing to retain said component in position, a flame tube having a portion interior of the vessel housing and a portion exterior to the vessel housing, said interior portion adapted to receive said source of heat, the exterior portion adapted to receive a duct for conveying hot air from the vessel, a separate warming pod section that fits either on the bottom or on the top of the vessel, and a lid.

2. The multipurpose vessel as defined in claim 1 wherein the warming pod section also comprises a ventilated lid to allow heated air to vent upwardly.

3. The multipurpose vessel as defined in claim 2 wherein the warming pod section has a ventilated lid further comprising a cushioned surface on the ventilated lid for seating or kneeling comfort.

4. The multipurpose vessel as defined in claim 1 wherein the duct is flexible to allow redirection of the heated air.

5. The multipurpose vessel as defined in claim 1 wherein the source of heat is a torch head onto which a fuel cylinder can be mounted.

6. The multipurpose vessel as defined in claim 1 further comprising a screened surface and a heat conducting plate mounted thereon to which the source of heat could be applied to produce a hot plate as an alternative use.

7. The multipurpose vessel as defined in claim 4 wherein the duct is removable for storage or transport.

8. The multipurpose vessel as defined in claim 1 further comprising vent openings near the top of the housing of said vessel to relieve excessive heat accumulation.

9. The multipurpose vessel as defined in claim 1 further comprising openings near the bottom of the housing of said vessel to promote drainage.

10. The multipurpose vessel as defined in claim 1 wherein the warming pod section has a carry handle for transportation.

* * * * *